(12) United States Patent
Kim et al.

(10) Patent No.: US 10,873,671 B2
(45) Date of Patent: Dec. 22, 2020

(54) METHOD AND APPARATUS FOR CONTROLLING DATA VOLUME OF SECONDARY GNB

(71) Applicant: KT CORPORATION, Gyeonggi-do (KR)

(72) Inventors: Ha Sung Kim, Seoul (KR); Jai-Sop Hyun, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/373,808

(22) Filed: Apr. 3, 2019

(65) Prior Publication Data

US 2019/0312980 A1  Oct. 10, 2019

(30) Foreign Application Priority Data

Apr. 5, 2018 (KR) .................. 10-2018-0039897
Feb. 22, 2019 (KR) .................. 10-2019-0020835

(51) Int. Cl.
*H04M 11/00* (2006.01)
*H04M 15/00* (2006.01)
(Continued)

(52) U.S. Cl.
CPC .......... *H04M 15/88* (2013.01); *H04M 15/60* (2013.01); *H04W 24/08* (2013.01); *H04W 28/20* (2013.01);
(Continued)

(58) Field of Classification Search
CPC ..... H04M 15/88; H04M 15/60; H04W 24/08; H04W 28/20; H04W 80/08; H04W 4/24; H04W 92/20
(Continued)

(56) References Cited

U.S. PATENT DOCUMENTS

2017/0013650 A1* 1/2017 Fujishiro ............... H04W 88/08
2019/0098684 A1* 3/2019 Tamura .................. H04M 15/66

FOREIGN PATENT DOCUMENTS

WO     2017/203956 A1    11/2017

OTHER PUBLICATIONS

Nokia et al., "TP of Evaluation of SCG split bearer as Option 3X", R3-170307, 3GPP TSG RAN WG3 AdHoc NR, Spokane, USA, Jan. 17-19, 2017.

(Continued)

*Primary Examiner* — Huy C Ho
(74) *Attorney, Agent, or Firm* — IP Legal Services, LLC

(57) ABSTRACT

Provided are a method and an apparatus for controlling NR data volume based on an interface between an NR base station and an LTE base station and an interface between an EPC and the LTE base station in a 5G non-standalone (NSA) network structure using an LTE EPC as a core network. The method includes receiving information about the volume of data that the secondary base station transmits to and receives from a terminal using a radio resource of the secondary base station from the secondary base station, and transmitting a secondary RAT data usage report message including the information about the volume of data the secondary base station transmits to and receives from the terminal using the radio resource of the secondary base station from the secondary base station to a mobility management entity (MME) using an S1-C interface.

15 Claims, 10 Drawing Sheets

(51) Int. Cl.
| | |
|---|---|
| *H04W 24/08* | (2009.01) |
| *H04W 80/08* | (2009.01) |
| *H04W 28/20* | (2009.01) |
| *H04W 4/24* | (2018.01) |
| *H04W 92/20* | (2009.01) |

(52) U.S. Cl.
CPC .............. *H04W 80/08* (2013.01); *H04W 4/24* (2013.01); *H04W 92/20* (2013.01)

(58) Field of Classification Search
USPC ........................................ 370/235; 455/405
See application file for complete search history.

(56) References Cited

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.1.0, Mar. 2018, pp. 1-341.

Fujitsu, "The guidance of how to measure secondary RAT data volume for EN-DC", R2-1804941, 3GPP TSG-RAN WG2 Meeting #101bis, Sanya, China, Apr. 16-20, 2018, pp. 1-3.

* cited by examiner

FIG.5

| IE/Group Name | Presence | Semantics description | Criticality | Assigned Criticality |
|---|---|---|---|---|
| Message Type | Mandatory |  | YES | reject |
| MeNB UE X2AP ID | Mandatory | Allocated at the MeNB | YES | reject |
| SgNB UE X2AP ID | Mandatory | Allocated at the en-gNB. | YES | reject |
| Secondary RAT Usage Report list | Mandatory |  | YES | ignore |
| MeNB UE X2AP ID Extension | Optional | Allocated at the MeNB | YES | reject |

FIG.6

| IE/Group Name | Presence | Range | IE type | Semantics description | Criticality | Assigned Criticality |
|---|---|---|---|---|---|---|
| Secondary RAT usage report item | | 1 .. < maxnoofbearers > | | | EACH | ignore |
| >E-RAB ID | Mandatory | | | | – | – |
| >Secondary RAT Type | Mandatory | | ENUMERATED (nR, ...) | | – | – |
| >E-RAB Usage Report List | | 1 | | | – | – |
| >>E-RAB Usage Report Item | | 1.. <maxnoof time periods> | | | EACH | ignore |
| >>>Start timestamp | Mandatory | | OCTET STRING (SIZE(4)) | UTC time encoded in the same format as the first four octets of the 64-bit timestamp format as defined in section 6 of IETF RFC 5905. It indicates the start time of the collecting period of the included Usage Count UL IE and Usage Count DL IE. | – | – |
| >>>End timestamp | Mandatory | | OCTET STRING (SIZE(4)) | UTC time encoded in the same format as the first four octets of the 64-bit timestamp format as defined in section 6 of IETF RFC 5905. It indicates the end time of the collecting period of the included Usage Count UL IE and Usage Count DL IE. | – | – |
| >>>Usage count UL | Mandatory | | INTEGER $(0..2^{64}-1)$ | The unit is: octets. | – | – |
| >>>Usage count DL | Mandatory | | INTEGER $(0..2^{64}-1)$ | The unit is: octets. | – | – |

METHOD AND APPARATUS FOR CONTROLLING DATA VOLUME OF SECONDARY GNB

CROSS REFERENCE TO RELATED APPLICATION

This application claims priority from Korean Patent Application Nos. 10-2018-0039897 & 10-2019-0020835, filed on Apr. 5, 2018 & Feb. 22, 2019, which are hereby incorporated by reference for all purposes as if fully set forth herein.

BACKGROUND OF THE INVENTION

1. Field of the Invention

The present disclosure relates to a method and an apparatus for controlling new radio (NR) data usage based on an interface between an new radio (NR) base station and an long term evolution (LTE) base station and an interface between an evolved packet core (EPC) and the LTE base station in a 5G non-standalone (NSA) network structure using an LTE EPC as a core network.

2. Description of the Prior Art

There are many studies conducted on next-generation mobile communication technologies according to demands for high-capacity data processing and high-speed data processing. For example, typical mobile communication systems, 3GPP Long-Term Evolution (LTE), LTE-Advanced, and 5G systems, are require to transmit and receive various types of a large amount of data, including image and radio data as well as voice data.

To deal with such requirements, a terminal and a base station require a technology for simultaneously using a plurality of carriers to transmit and receive data. For example, studies have been conducted on i) a carrier aggregation technique for enabling one base station to aggregate a plurality of carriers for communicating with a terminal or ii) a dual connectivity technique for enabling a plurality of base stations to perform communication with a terminal simultaneously using a plurality of carriers.

Lately, a next-generation radio access technology is being developed and introduced. However, it is expected to need a certain period of time in order to provide a communication service using only a base station employing the next-generation radio access technology. Therefore, it is necessary to provide a service through carrier aggregation or dual connectivity for simultaneously using i) an LTE base station employing a typical radio access technology and ii) an new radio (NR) base station employing the next-generation radio access technology.

Particularly, when dual connectivity is configured where an LTE base station is a master base station and an NR base station is a secondary base station, a core network may be an LTE based evolved packet core (EPC) network. Further, for billing purpose, it is required to separately and additionally check data usage in transmission and reception using a radio resource of the NR base station employing the next-generation radio access technology.

However, since control protocols of the NR base station and the EPC network are not directly connected, there is no separate procedure introduced for identifying data usage using the radio resource of the NR base station.

SUMMARY OF THE INVENTION

The present disclosure proposes a method for measuring data usage of using a radio resource of an NR base station and reporting the measured data usage to a core network in a 5G NSA network structure that includes an LTE EPC as the core network.

In accordance with an embodiment, a method may be provided for a master base station to transmit data volume information of a secondary base station in a dual-connectivity situation The method may include: receiving information about the volume of data that the secondary base station transmits to and receives from a terminal using a radio resource of the secondary base station from the secondary base station; and transmitting a secondary radio access technology (RAT) data usage report message including the information about the volume of data that the secondary base station transmits to and receives from the terminal using the radio resource of the secondary base station from the secondary base station to a mobility management entity (MME) using an S1-C interface, wherein the master base station and the secondary base station use different radio access technologies.

In accordance with another embodiment, a method may be provided for a secondary base station to transmit data volume information of the secondary base station in a dual-connectivity situation. The method may include: counting information about the volume of data that the secondary base station transmits to and receives from a terminal using a radio resource of the secondary base station; and transmitting the information about the volume of data that the secondary base station transmits to and receives from the terminal using the radio resource of the secondary base station to a master base station using an X2 interface, wherein the information about the volume of data that the secondary base station transmits to and receives from the terminal using the radio resource of the secondary base station is included in a secondary RAT data usage report message transmitted by the master base station to a mobility management entity (MME), and the master base station and the secondary base station use different radio access technologies.

In accordance with still another embodiment, a master base station may be provided for transmitting data volume information of a secondary base station in a dual-connectivity situation. The master base station may include: a receiver configured to receive information about the volume of data that the secondary base station transmits to and receives from a terminal using a radio resource of the secondary base station from the secondary base station; and a transmitter configured to transmit a secondary RAT data usage report message including the information about the volume of data that the secondary base station transmits to and receives from the terminal using the radio resource of the secondary base station from the secondary base station to a mobility management entity (MME) using an S1-C interface, wherein the master base station and the secondary base station use different radio access technologies.

In accordance with further another embodiment, a secondary base station may be provided for transmitting data volume information of the secondary base station in a dual-connectivity situation. The secondary base station may include: a controller configured to count information about the volume of data that the secondary base station transmits to and receives from a terminal using a radio resource of the secondary base station; and a transmitter configured to transmit the information about the volume of data that the secondary base station transmits to and receives from the terminal using the radio resource of the secondary base station to a master base station using an X2 interface, wherein the information about the volume of data that the secondary base station transmits to and receives from the terminal using the radio resource of the secondary base station is included in a secondary RAT data usage report message transmitted by the master base station to a mobility management entity (MME), and the master base station and the secondary base station use different radio access technologies.

According to the embodiments of the present disclosure, when an LTE base station and an NR base station configure dual connectivity for a terminal, it is possible to measure the data usage of using a radio resource of the NR base station and report the measured data usage to a core network.

Further, according to the present disclosure, it is possible for the core network to separately identify i) the data usage of using a radio resource of the NR base station and ii) the data usage using a radio resource of the LTE base station.

BRIEF DESCRIPTION OF THE DRAWINGS

The above and other aspects, features and advantages of the present disclosure will be more apparent from the following detailed description taken in conjunction with the accompanying drawings, in which:

FIG. 5 illustrates information elements of a report message according to one embodiment;

FIG. 6 illustrates a secondary RAT usage report list information element according to one embodiment;

DETAILED DESCRIPTION OF THE EXEMPLARY EMBODIMENTS

Figure 1:
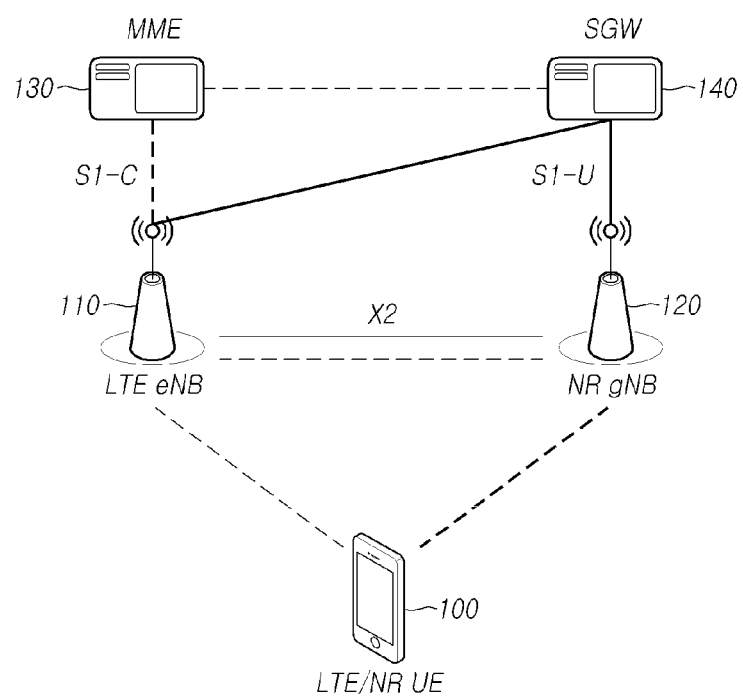
FIG. 1 illustrates a dual-connectivity network structure including base stations each employing a radio access technology different from the other according to one embodiment.

Many studies have been conducted for developing a next-generation radio access technology to satisfy 5G requirements such as a high-frequency band, a high-capacity data processing technology, and a high-speed data transmission and reception technology. Currently, most communication services are provided using a typical 4G (LTE) radio access technology. To provide a communication service, it requires i) a plurality of base stations for establishing coverage of the communication service and ii) terminals supporting a radio access technology suitable for the communication service.

In order to provide a communication service using base stations employing the next-generation radio access technology, it takes time to deploy a plurality of base stations employing the next-generation radio access technology and to establish service coverage using them. Further, to apply the next-generation radio access technology, it needs to change core-network entities accessing an NR base station.

Accordingly, it is necessary to provide a higher quality communication service using an NR base station where the NR base station is available although a communication service is provided mainly using a typical LTE base station and a core network.

In the present disclosure, a non-standalone (NSA) network refers to a network where an NR base station performs communication with a terminal in cooperation of an EPC or an LTE base station and a standalone (SA) network refers to a network where an NR base station associated with an NR core network alone performs communication with a terminal. In the present disclosure, a master base station is a base station that has a control plane connected to a core network and serves as an anchor. A secondary base station is a base station that provides additional radio resources and provides only user-plane data.

A typical LTE wireless network supports interworking using an X2 interface in order to support mobility management and dual connectivity between LTE base stations having the same structure/function.

With the introduction of a new 5G NSA network, it is necessary for an NR base station to interwork with a typical LTE base station. In particular, when a master LTE base station serves as an anchor, it is required to transmit a message of a dependent secondary NR base station through the master base station. In addition, it is necessary to design interworking between the NR base station and the LTE base station, which employ different radio access technologies, in consideration of the functions, bearer types, and different capabilities of the NR and LTE base stations.

The typical LTE wireless network is able to support LTE data usage information from an LTE base station, which is linked to an evolved packet core (EPC) as a core network system, through an S1 interface and an application protocol.

However, with the introduction of the new 5G NSA network, it is unable to connect a control plane of the NR base station serving as the secondary base station in a dual connectivity situation to the EPC. Further, since both 4G data through the LTE technology and 5G data through the NR technology are used, the core network essentially needs not only information about LTE data usage but also information about NR data usage. The core network performs control, such as calculation and report of LTE data and NR data. Further, the core network is able to perform an accurate 5G data billing operation accordingly. In particular, unlike the master base station employing the LTE technology, the secondary base station employing the NR technology has no S1-C interface connection with an MME and thus is unable to directly report NR data usage to the MME.

Therefore, it is required to develop separate procedures and methods to report NR data usage (NR data volume) to the MME in the 5G NSA network structure.

The present disclosure is related to a method and an apparatus for controlling NR data volume based on an interface between an NR base station and an LTE base station and an interface between an EPC and the LTE base station in a 5G NSA network structure using an LTE EPC as a core network. In the present disclosure, data usage refers to the amount of data transmitted and received between a terminal and a base station using a radio resource of the base station and may be referred to as data volume, a data counting result, or the like. There is no limitation on terms for data usage, which may indicate a value obtained by counting data transmitted and received between a base station and a terminal at a specific time.

FIG. 1 illustrates a dual-connectivity network structure including base stations each employing a radio access technology different from the other according to one embodiment.

Referring to FIG. 1, a 5G NSA network includes an LTE EPC core network (CN), an LTE radio access network (LTE RAN) 110 serving as a master base station, an NR radio access network (NR RAN) 120 as a secondary base station, in which an EPC is connected to an external data network (DN) via a PDN gateway (PGW). The EPC may include an MME 130 and a serving gateway (SGW) 140.

Dual Connectivity refers to a technique that enables a terminal 100 supporting one or more RXs/TXs to simultaneously use radio resources controlled by one or more base stations 110 and 120 and may be referred to as various terms, such as dual connection and DC.

A master base station 110 is a base station serving as a connection anchor in dual connectivity and functioning as a base for handover of the terminal 100. A secondary base station 120 is a base station providing additional radio resources to the terminal 100 together with the master base station 110. The following description will be made about a 5G NSA network structure (e.g., 5G NSA structure option 3), and the master base station 110 may be referred to as various terms, such as an LTE base station, a master node (MN), an eNB, and an anchor base station. Similarly, the secondary base station 120 may be referred to as various terms, such as an NR base station, a gNB, an en-gNB, and a secondary node (SN). These terms are not limited as long as the foregoing definition of a base station is satisfied.

A structure for configuring dual connectivity using the LTE base station 110 and the NR base station 120 is referred to as E-UTRAN new radio-dual connectivity (EN-DC), in which the LTE base station 110 operates as a master base station, and the NR base station 120 operates as a secondary base station. The LTE base station 110 and the NR base station 120 are connected via an X2 interface, and the NR base station 120 is connected to the core SGW 140 through an S1-U interface. That is, only user plane of the NR base station 120 is associated with the core network, and a control plane of the LTE base station 110 is associated with the core network. The LTE base station 110 is associated with the MME 130 via an S1-C interface and is associated with the SGW 140 via an S1-U interface.

A 5G UE 100 includes both NR/LTE wireless transceivers and radio protocols and is connected via NR/LTE radio interfaces (NR-Uu/LTE-Uu). The UE 100 is able to access the LTE base station 110 and the NR base station 120 through LTE-NR dual connectivity (EN-DC).

A user-plane interface between the SGW 140, which is an LTE core network responsible for data processing, and the NR gNB 120 and a user-plane interface between the SGW 140 and the LTE eNB 110 interwork via the respective S1-U interfaces. However, the S1-C (or S1-MME) interface, which is a control-plane interface, interworks only between the MME 130 and the LTE eNB 110 in the NSA structure. However, the 5G NSA network structure described with reference to FIG. 1 is merely an example, and the present embodiment may also be applied to an NSA network structure option 7 in which an LTE base station 110 is connected to a 5G core network.

Hereinafter, a method of a master base station for reporting information about a data volume of a secondary base station in the foregoing EN-DC network structure will be described in detail.

Figure 2:
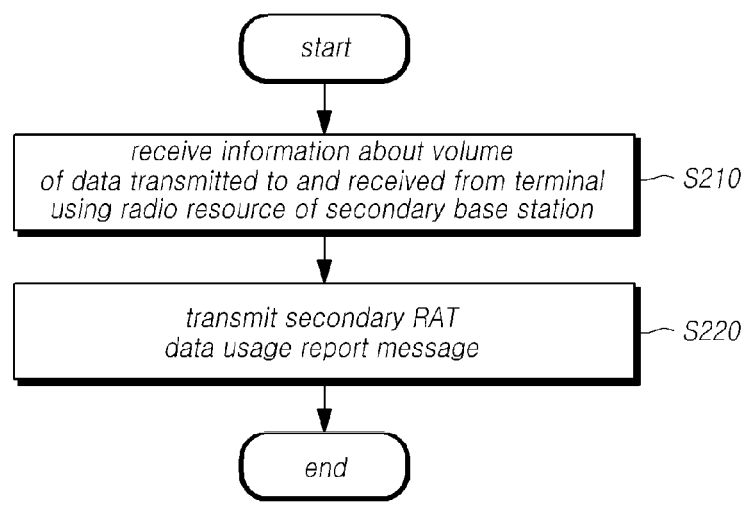
FIG. 2 is a flowchart illustrating operations of a master base station according to one embodiment.

FIG. 2 is a flowchart illustrating operations of a master base station according to one embodiment.

Referring to FIG. 2, the master base station may receive, from a secondary base station, information about the volume of data that the secondary base station transmits to and receives from a terminal using a radio resource of the secondary base station (S210).

For example, the information about the volume of data transmitted to and received from the terminal using the radio resource of the secondary base station may be determined as the total amount of i) downlink data transmitted to the terminal using an NR radio resource of the secondary base station and ii) uplink data received from the terminal using the NR radio resource.

From the viewpoint of a bearer, the information about the volume of data that the secondary base station transmits to and receives from the terminal using the radio resource of the secondary base station may include information about the volume of data transmitted to and received from the terminal in association with a secondary base station-teminated E-RAB. Specifically, the E-RAB is associated with the terminal and the secondary base station, and data transmitted and received through the E-RAB may be included in the information about the volume of data transmitted to and received from the terminal using the radio resource of the secondary base station.

For the secondary base station to transmit the information about the volume of data transmitted to and received from the terminal using the radio resource of the secondary base station to the master base station, it is required to count the volume of data.

For example, a node that hosts a PDCP may count the information about the volume of data that the secondary base station transmits to and receives from the terminal using the radio resource of the secondary base station. Specifically, when the secondary base station performs PDCP hosting for the terminal, the secondary base station counts the volume of data. If a split bearer is configured and a PDCP of the master base station controls the split bearer, the master base station may perform the counting. That is, since the counting is performed based on a PDCP SDU of the PDCP layer, the node that hosts the PDCP performs the counting.

More specifically, the volume of downlink data is counted in bytes of a PDCP SDU successfully delivered to the terminal through the secondary base station or bytes of a PDCP SDU transmitted to the terminal. For example, when an RLC entity associated with the PDCP is in an acknowledged mode (AM), the node hosting the PDCP counts the bytes of the PDCP SDU successfully delivered to the terminal through the secondary base station, thereby obtaining information about the volume of downlink data. In another example, when the RLC entity associated with the PDCP is in an unacknowledged mode (UM), the node hosting the PDCP counts the bytes of the PDCP SDU transmitted to the terminal through the secondary base station, thereby obtaining information about the volume of downlink data.

The volume of uplink data is counted in bytes of a PDCP SDU received by the node that hosts the PDCP using the radio resource of the secondary base station.

The information about the volume of data that the secondary base station transmits to and receives from the terminal using the radio resource of the secondary base station does not include the volume of data of a packet forwarded when a PDCP entity is reconfigured.

Further, when PDCP duplication is activated, transmitted duplicate packets are counted and included only once, thus accurately counting the accurate volume of data.

The volume of data counted by the above method is included in a report message transmitted from the secondary base station to the master base station. The report message may include various information elements, and each information element will be separately described below with reference to drawings.

The master base station transmits a secondary RAT data usage report message including the information about the volume of data that the secondary base station transmits to and receives from the terminal using the radio resource of the secondary base station to an mobility management entity (MME) using an S1-C interface (S220).

For example, the secondary RAT data usage report message may include information about the volume of data transmitted to and received from the terminal using the radio resource of the secondary base station for each EPS bearer. The information about the volume of data transmitted to and received from the terminal using the radio resource of the secondary base station may be separated by EPS bearer and may be included in the secondary RAT data usage report message. Accordingly, a core network may obtain information about the volume of data using NR radio resources per EPS bearer.

The secondary RAT data usage report message may further include information about the volume of data transmitted to and received from the terminal using the radio resource of the secondary base station in association with a master base station-terminated bearer. That is, the information about the volume of data received from the secondary base station may include only information about the volume of data associated with the secondary base station-terminated E-RAB, and the information about the volume of data associated with the master base station-terminated bearer may be counted by the master base station and may be included in the secondary RAT data usage report message. Alternatively, the information about the volume of data associated with the master base station-terminated bearer may also be counted by the secondary base station and may be received by the master base station via a separate report message.

As described above, the master base station and the secondary base station use different radio access technologies. For example, the master base station may use the LTE radio access technology, and the secondary base station may use the NR radio access technology. Alternatively, the master base station may perform communication with the terminal using a radio resource to which one preset subcarrier spacing is applied, and the secondary base station may perform communication with the terminal by applying subcarrier spacing dynamically allocated among a plurality of subcarrier spacings. In addition, the secondary base station may be configured to include a central unit and a distributed unit by logically/physically dividing the functions of the base station. The central unit may perform functions of RRC and PDCP layers, and the distributed unit may perform functions of RLC, MAC, and PHY layers.

As described above, the master base station obtains, from the secondary base station, the information about the volume of data transmitted to and received from the terminal using the radio resource of the secondary base station. Further, the master base station transmits a secondary RAT data usage report message including the obtained information about the volume of data through the S1-C interface with the MME. The MME receives the secondary RAT data usage report message, and the core network may check the usage of NR radio resources using this message and may use the usage for billing.

Hereinafter, a procedure for transmitting the foregoing message, details about counting data volume, and information elements of the report message will be described in detail with reference to drawings.

Figure 3:
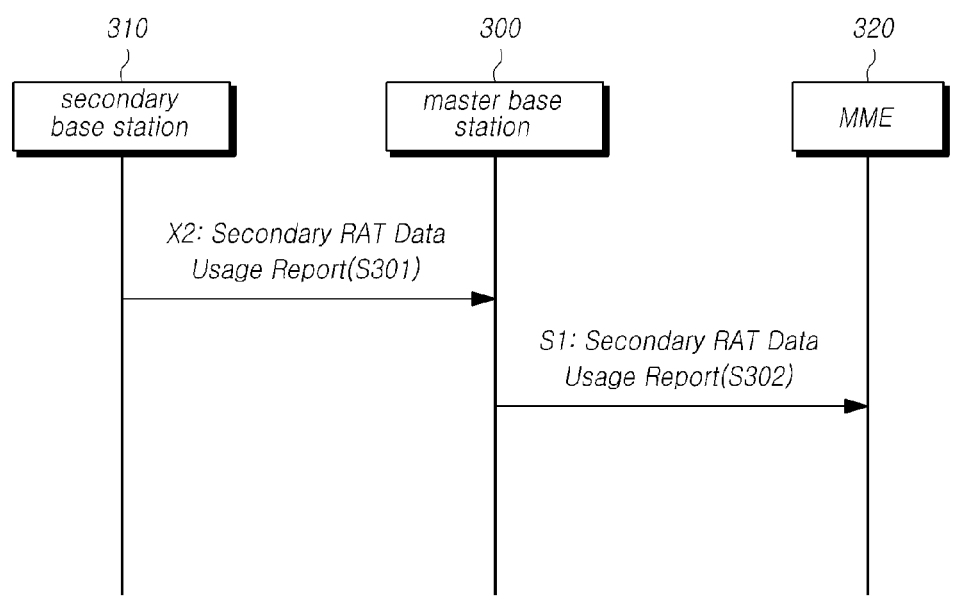
FIG. 3 is a signal flowchart illustrating a delivery path of a secondary RAT data usage report message according to one embodiment.

FIG. 3 is a signal flow illustrating a delivery path of a secondary RAT data usage report message according to one embodiment.

Referring to FIG. 3, a secondary base station 310 generates a secondary RAT data usage report including information about the volume of data transmitted to and received from a terminal using counted NR radio resources and transmits the secondary RAT data usage report to a master base station 300 (S301). The information about the volume of data transmitted to and received from the terminal using the NR radio resources is transmitted through an X2 interface between the secondary base station 310 and the master base station 300. The secondary base station 301 may preset a parameter to count the information about the volume of data transmitted to and received from the terminal using the NR radio resources.

The secondary base station 301 may also preset a parameter for transmitting the information about the volume of data transmitted to and received from the terminal using the NR radio resources to the master base station 300. The secondary base station 301 may transmit the information about the volume of data transmitted to and received from the terminal using the NR radio resources to the master base station 300 according to the set parameters. The transmission may be periodically performed and may be performed when a particular event is triggered as needed.

The master base station 300 transmits the received information about the volume of data transmitted to and received from the terminal using the NR radio resources via to an MME 320 via a secondary RAT data usage report message (S302). The secondary RAT data usage report message may be transmitted to the MME 320 via an S1 interface. Specifically, the secondary RAT data usage report message is transmitted to the MME 320 via an S1-C interface.

If necessary, the master base station 300 may further include information about the volume of data using NR radio resources in association with a bearer terminating at the master base station 300 in the secondary RAT data usage report message. Alternatively, the secondary RAT data usage report message may separately include information about the usage of NR radio resources per EPS. The secondary RAT data usage report message may be periodically transmitted to the MME 320. Alternatively, transmission of the secondary RAT data usage report message may be triggered when a preset event occurs. The master base station 300 may configure in advance a parameter for transmitting the secondary RAT data usage report message.

In operation S302, the master base station 300 receives the secondary RAT data usage report message including the information about the volume of data using the NR radio resources and transmits the message to the MME 320. That is, the messages in operations S301 and S302 may be named the same term. However, in the present specification, for the convenience of understanding, the messages in the two operations are separately described by different terms.

Figure 4:
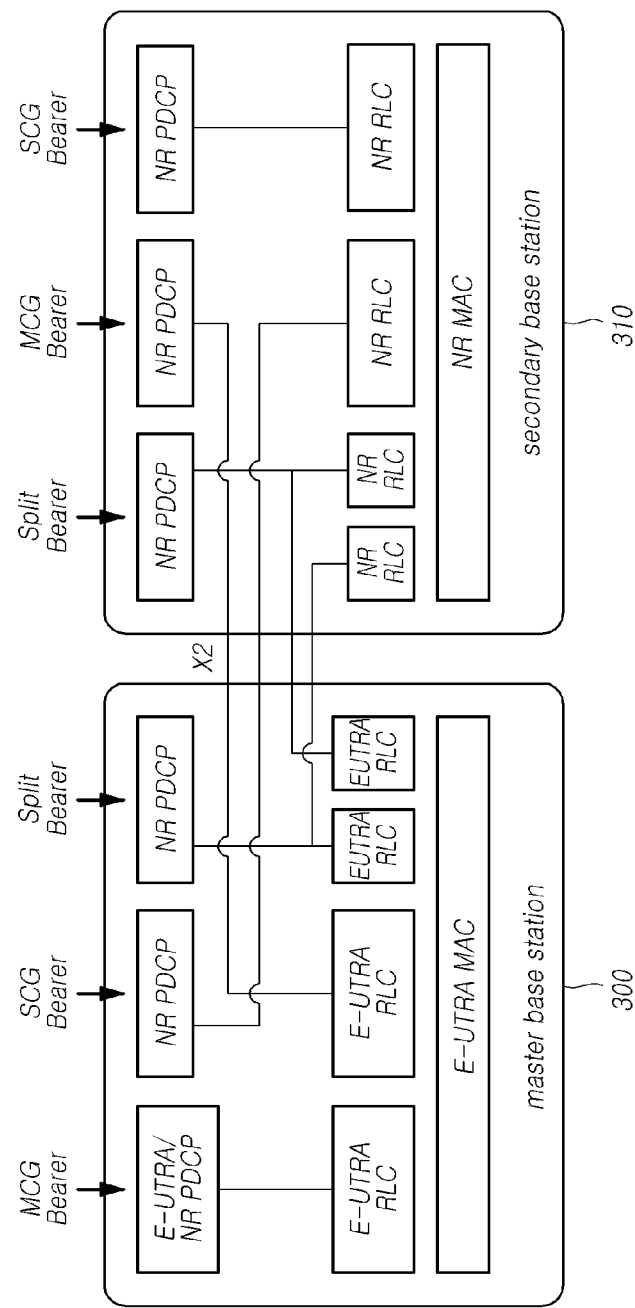
FIG. 4 illustrates a user-plane architecture of a master base station and a secondary base station in a dual-connectivity structure according to one embodiment.

FIG. 4 illustrates a user-plane architecture of a master base station and a secondary base station in a dual-connectivity structure according to one embodiment.

Referring to FIG. 4, the master base station 300 and the secondary base station 310 interwork via an X2 interface. The master base station 300 and the secondary base station 310 may each provide one or more bearers for a terminal. Accordingly, the master base station 300 and the secondary base station 310 may each configure an MCG bearer and an SCG bearer. If necessary, the master base station 300 and the secondary base station 310 may configure a split bearer.

The master base station 300 may configure an E-UTRA PDCP and an NR PDCP to interwork with the secondary base station 310. The secondary base station 310 may configure only an NR PDCP entity. The master base station 300 may configure an E-UTRA RLC entity and an E-UTRA MAC entity. The secondary base station 310 may configure an NR RLC entity and an NR MAC entity.

The secondary base station 310 may measure information about the volume of data transmitted to and received from the terminal using a radio resource (NR radio resource) of the secondary base station.

For example, the secondary base station calculates the volume of data on the basis of a PDCP SDU packet transmitted from a PDCP layer of the secondary base station 310 to an RLC layer for a preset measurement time. For example, a packet may be calculated in bits or bytes. If necessary, when counting the information about the volume of data, a packet header may be excluded. In addition, the measurement time may be fixed or may be dynamically changed. The measurement time may be set by a billing device, an MME 320, the base station 300 or 310, or an O&M (or EMS) device.

NR data volume may be calculated separately for each terminal, and whether to calculate or report NR data volume may be separately configured for each. Alternatively, NR data volume may be calculated per EPS bearer or per E-RAB. Alternatively, NR data volume may be calculated per individual used QCI. However, when the master cell group (MCG) bearer and the secondary cell group (SCG) bearer are configured and used together for the terminal, NR data volume may be calculated with respect to a combination of a plurality of QCIs.

As described above, data forwarded from the secondary base station 310 to the master base station 300 may be excluded from the calculation of the volume. For example, a forwarding packet generated for reconfiguring a PDCP entity may be excluded from the calculation of NR data volume.

Likewise, data of an SCG bearer used for carrier aggregation (CA) duplication may be excluded from the calculation of NR data volume. That is, data used for duplication is counted only once.

Alternatively, NR data volume may be calculated with respect to both an SCG bearer and a split bearer. That is, NR data volume may be counted with respect to all of 1) a master base station-terminated SCG bearer, 2) a secondary base station-terminated SCG bearer, 3) a master base station-terminated split bearer, and 4) a secondary base station-terminated split bearer. However, NR data volume may not be calculated or reported with respect to a particular bearer type depending on the configuration.

When NR data is transmitted via a split bearer from the master base station 300 to the secondary base station 310 and then fails to be transmitted from the secondary base station 310 to the terminal (e.g., due to a failure in an NR radio link), the NR data may be included in or excluded from the calculation of the volume.

For example, when the RLC entity associated with the PDCP is in the AM, the secondary base station 310 may count the bytes of a PDCP SDU successfully delivered to the terminal through the secondary base station 310, thereby obtaining information about the volume of downlink data. That is, when the RLC is in a response mode, only the PDCP SDU, an ACK of which is transmitted from the terminal for successful reception, may be counted as NR radio resource usage.

In another example, when the RLC entity associated with the PDCP is in the UM, the secondary base station 310 may count the bytes of a PDCP SDU transmitted to the terminal through the secondary base station, thereby obtaining information about the volume of downlink data. That is, when the RLC entity is in the UM, it is impossible to identify feedback on whether the terminal successfully receives the PDCP SDU. Accordingly, the base station may count all transmitted PDCP SDUs.

In still another example, the volume of uplink data is counted in bytes of a PDCP SDU received by a node that hosts the PDCP using the radio resource of the secondary base station 310. In addition, data of a split bearer used for dual connectivity (DC) duplication may be included in the volume.

With respect to the master base station-teminated SCG bearer and the master base station-terminated split bearer, NR data volume may be reported by the master base station 300. With respect to the secondary base station-terminated SCG bearer and the secondary base station-terminated split bearer, NR data volume may be reported from the secondary base station 310 to the master base station 300.

As described above, NR data volume may be periodically transmitted. Periodic report on/off functions may be supported by the MME (including the O&M device) or the base station (including the O&M device). Also, a plurality of report period timers for a periodic report may be preset. For example, a base station may select a single timer or a plurality of timers to use from among a plurality of available report period timer sets. A different timer may be selected for each individual EPS bearer, or the same timer may be applied to all EPS bearers. If necessary, a report period timer may vary by automatic or manual setup in order to reduce network signaling loads due to frequent reporting of NR data volume.

FIG. 5 illustrates information elements of a report message according to one embodiment. FIG. 6 illustrates information included in a secondary RAT usage report list information element according to one embodiment.

Referring to FIG. 5, a report message may include information about the volume of data transmitted to and received from a terminal using a radio resource of a secondary base station, which is transmitted from the secondary base station to a master base station. The report message may be a secondary RAT data usage report message but may be referred to as a report message in order to be distinguished from a secondary RAT data usage report message transmitted by the master base station to an MME. However, the report message and the secondary RAT data usage report message may include the same information.

The report message may include a message type information element, an MeNB UE X2AP ID information element, an SgNB UE X2AP ID information element, and a secondary RAT usage report list information element. Optionally, the report message may further include an MeNB UE X2AP ID extension information element. For example, the message type information element indicates a type of a message transmitted from the secondary base station to the master base station. The MeNB UE X2AP ID information element indicates a terminal identification used to identify a terminal on an X2 interface control plane and indicates information for the master base station to identify the terminal. The SgNB UE X2AP ID information element indicates information for the secondary base station to identify a terminal on an X2 interface control plane. The secondary RAT usage report list information element includes information about the volume of data transmitted to and received from a terminal using a radio resource of the secondary base station.

Referring to FIG. 6, the secondary RAT usage report list information element may include E-RAB identification information, secondary base station type information, E-RAB usage report list information, usage count UL information, and usage count DL information.

In the secondary RAT usage report list information element, each field is configured in the secondary RAT usage report item. The secondary RAT usage report item indicates a value ranging from 1 to the maximum number of bearers. That is, the number may be indicated according to the number of secondary base station-terminated E-RABs. Therefore, as described above, the volume of data using radio resources of the secondary base station may be indicated for each E-RAB.

The E-RAB identification information includes identification information about a secondary base station-terminated E-RAB. The secondary base station type information indicates whether the secondary base station is an NR base station. The E-RAB usage report list information includes the usage count UL information and the usage count DL information and thus actually includes counting information about the volume of data used in an E-RAB. The usage count UL information and the usage count DL information may be counted and included in bytes. Alternatively, the usage count UL information and the usage count DL information may include values in octets.

According to the foregoing operation, a master base station receives information about the volume of data using NR radio resources from a secondary base station and transmits a secondary RAT data usage report message to an MME.

Hereinafter, operations of a secondary base station to perform the foregoing embodiments will be described.

Figure 7:
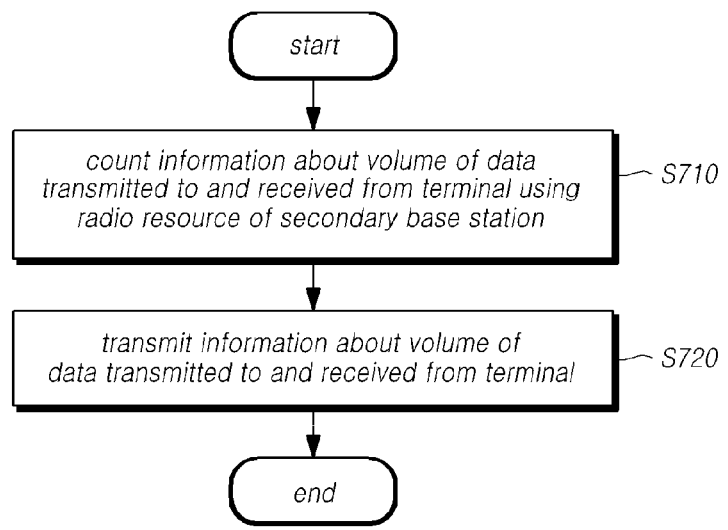
FIG. 7 is a flowchart illustrating operations of a secondary base station according to one embodiment.

FIG. 7 is a flowchart illustrating operations of a secondary base station according to one embodiment.

Referring to FIG. 7, the secondary base station counts (e.g., measures) a volume of data transmitted to and received from a terminal using a radio resource of the secondary base station and generates the information on the volume of data (S710).

For example, the information about the volume of data that the secondary base station transmits to and receives from the terminal using the radio resource of the secondary base station includes information about the volume of data transmitted to and received from the terminal in association with a secondary base station-terminated E-RAB.

In order to count the volume of data, the secondary base station separately counts downlink data and uplink data.

For example, the secondary base station may count the volume of downlink data in bytes of a PDCP SDU successfully delivered to the terminal through the secondary base station or bytes of a PDCP SDU transmitted to the terminal. Specifically, when an RLC entity associated with a PDCP is in the AM, the secondary base station counts the bytes of a PDCP SDU successfully delivered to the terminal through the secondary base station, thereby obtaining information about the volume of downlink data. However, when the RLC entity associated with the PDCP is in the UM, the secondary base station counts the bytes of a PDCP SDU transmitted to the terminal through the secondary base station, thereby obtaining information about the volume of downlink data.

In another example, the secondary base station may count the volume of uplink data in bytes of a PDCP SDU received by a node that hosts the PDCP using the radio resource of the secondary base station.

The secondary base station transmits the information about the volume of data that the secondary base station transmits to and receives from the terminal using the radio resource of the secondary base station to a master base station using an X2 interface (S720).

The secondary base station transmits the information about the volume of data transmitted to and received from the terminal using the radio resource of the secondary base station to the master base station through the X2 interface periodically or according to triggering of a specific event.

The information about the volume of data transmitted to and received from the terminal using the radio resource of the secondary base station may be included in a report message. The report message may include a message type information element, an MeNB UE X2AP ID information element, an SgNB UE X2AP ID information element, and a secondary RAT usage report list information element. In particular, the secondary RAT usage report list information element may include E-RAB identification information, secondary base station type information, E-RAB usage report list information, usage count UL information, and usage count DL information. The volume of data transmitted to and received from the terminal using the radio resource of the secondary base station is stored in the usage count UL information and the usage count DL information.

The report message may include information about the volume of data transmitted to and received from the terminal using the radio resource of the secondary base station per secondary base station-terminated E-RAB. The volume of data transmitted to and received from the terminal using the radio resource of the secondary base station may not include the volume of data of a packet forwarded when the PDCP entity is reconfigured. In addition, when PDCP duplication is activated, duplicated packets are counted and included only once in the volume of data transmitted to and received from the terminal using the radio resource of the secondary base station.

As described above, the information about the volume of data that the secondary base station transmits to and receives from the terminal using the radio resource of the secondary base station is included in a secondary RAT data usage report message transmitted by the master base station to an MME, and the master base station and the secondary base station use different radio access technologies. The secondary RAT data usage report message may further include information about the volume of data transmitted to and received from the terminal using the radio resource of the secondary base station in association with a master base station-terminated bearer. In addition, the secondary RAT data usage report message may include information about the volume of data transmitted to and received from the terminal using the radio resources of the secondary base station per EPS bearer.

Figure 8:
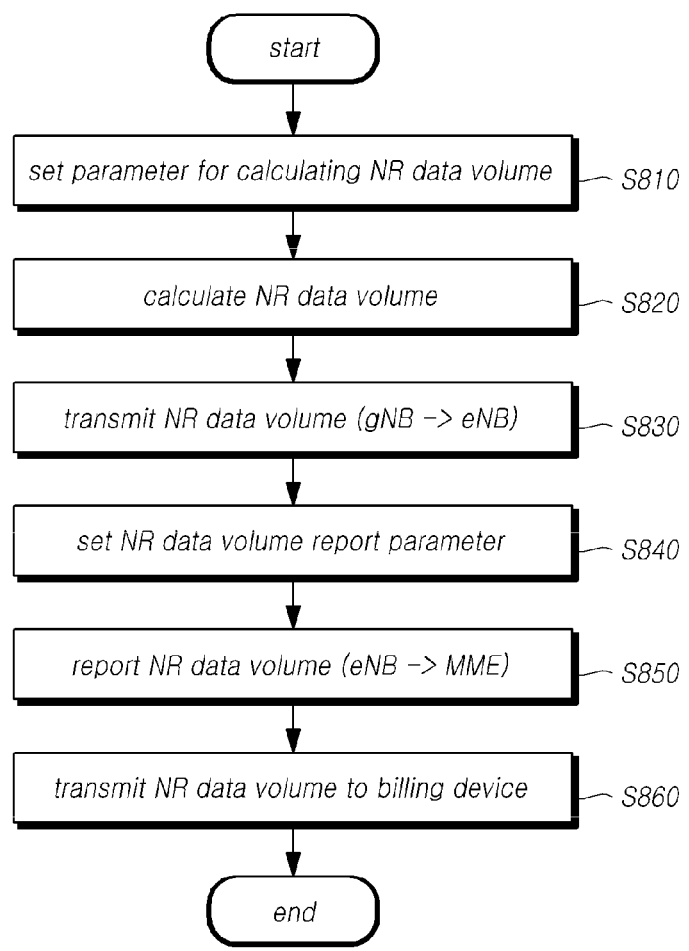
FIG. 8 is a flowchart illustrating a method for delivering a secondary RAT usage report using a master base station and a secondary base station according to one embodiment.

FIG. 8 is a flowchart illustrating a method for delivering a secondary RAT usage report using a master base station and a secondary base station according to one embodiment.

Referring to FIG. 8, the overall operations of the base stations and a core network according to the present embodiment will be described as a series of system operations.

First, the secondary base station may set a parameter for calculating NR data volume (S810). In order to set the parameter for calculating the NR data volume, the secondary base station may receive and store a relevant parameter from the master base station or the core network. A plurality of parameters for calculating NR data volume may be configured and stored in the secondary base station, and a parameter to be set in the secondary base station may be dynamically determined.

When the parameter for calculating the NR data volume is set, the secondary base station calculates NR data volume for the volume of data transmitted to and received from a terminal using a radio resource (NR radio resource) of the secondary base station according to the parameter (S820). As described above, the secondary base station may count a PDCP SDU that is successfully delivered or is transmitted in bytes according to the mode of an RLC associated with a PDCP. In addition, the secondary base station may not include the volume of data of a packet, which is forwarded when the PDCP entity is reconfigured, in the counting. Alternatively, when PDCP duplication is activated, the secondary base station may count duplicated packets only once.

When the NR data volume is completely counted and transmission is triggered, the secondary base station transmits the NR data volume to the master base station (S830). The NR data volume may be transmitted via a report message. The report message may include information about the volume of data transmitted to and received from the terminal using the radio resource of the secondary base station per secondary base station-terminated E-RAB. In addition, the report message may include various information elements illustrated in FIG. 5 and FIG. 6.

Upon receiving the report message, the master base station may set an NR data volume report parameter (S840). The NR data volume report parameter includes various parameters necessary for the master base station to transmit a secondary RAT data usage report message to the core network. Operation S840 may be configured simultaneously with or before operation S810. A plurality of NR data volume report parameters may be stored, or a parameter to be applied may be dynamically indicated.

The master base station transmits an NR data volume report to an MME according to the set NR data volume report parameter (S850). The NR data volume report is transmitted via the secondary RAT data usage report message. The secondary RAT data usage report message may include information about the volume of data transmitted to and received from the terminal using the radio resource of the secondary base station per EPS bearer. The secondary RAT data usage report message may further include information about the volume of data transmitted to and received from the terminal using the radio resource of the secondary base station in association with a master base station-terminated bearer.

The MME transmits the information about the volume of data transmitted to and received from the terminal using the radio resource of the secondary base station included in the secondary RAT data usage report message to a billing device (S860). The billing device may perform billing based on the information about the volume of data transmitted to and received from the terminal using the radio resource of the secondary base station according to the operator's setting. The information about the volume of data transmitted to and received from the terminal using the radio resource of the secondary base station may be variously used according to the operator's setting.

Operations S810 to S860 may be performed as one or more integrated operations as needed, or one operation may be divided into two or more separate operations. In addition, the order of operations S810 to S860 is illustrated as an example and may be changed in various combinations.

As described above, it is possible to make an accurate charge for various 5G services through calculation and report of NR data volume in an LTE EPC-based 5G NSA network described in the present disclosure, thus smoothly providing commercial 5G services.

Hereinafter, the structures of a master base station and a secondary base station which are capable of performing part or all of the embodiments illustrated in FIG. 1 to FIG. 8 will be described with reference to drawings.

Figure 9:
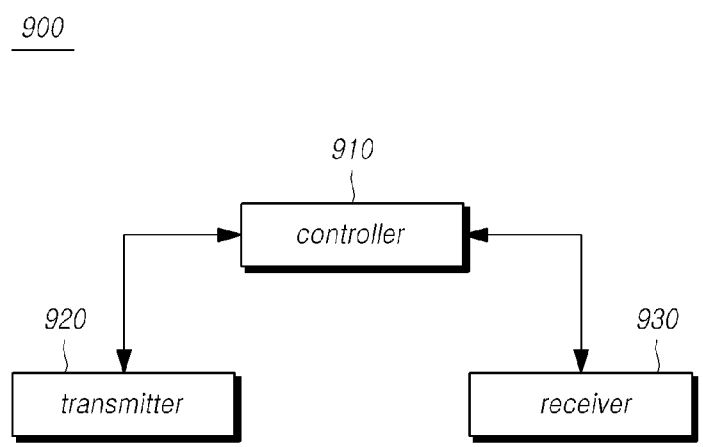
FIG. 9 is a block diagram illustrating a structure of a master base station according to one embodiment.

FIG. 9 is a block diagram illustrating a structure of a master base station according to one embodiment.

Referring to FIG. 9, the master base station 900 that transmits data volume information of a secondary base station in a dual-connectivity situation may include: a receiver 930 that receives information about the volume of data that the secondary base station transmits to and receives from a terminal using a radio resource of the secondary base station from the secondary base station; and a transmitter 920 that transmits a secondary RAT data usage report message including the information about the volume of data that the secondary base station transmits to and receives from the terminal using the radio resource of the secondary base station from the secondary base station to an MME using an S1-C interface.

For example, the information about the volume of data transmitted to and received from the terminal using the radio resource of the secondary base station may be determined as the total amount of i) downlink data transmitted to the terminal using an NR radio resource of the secondary base station and ii) uplink data received from the terminal using the NR radio resource. From the viewpoint of a bearer, the information about the volume of data that the secondary base station transmits to and receives from the terminal using the radio resource of the secondary base station may include information about the volume of data transmitted to and received from the terminal in association with a secondary base station-terminated E-RAB.

The information about the volume of data that the secondary base station transmits to and receives from the terminal using the radio resource of the secondary base station may be counted by a node that hosts a PDCP. Specifically, when the secondary base station performs PDCP hosting for the terminal, the secondary base station counts the volume of data. If a split bearer is configured and a PDCP of the master base station 900 controls the split bearer, the master base station 900 may perform the counting. That is, since the counting is performed based on a PDCP SDU of the PDCP layer, the node that hosts the PDCP performs the counting.

For example, the volume of downlink data to be counted is counted in bytes of a PDCP SDU successfully delivered to the terminal through the secondary base station or bytes of a PDCP SDU transmitted to the terminal. For example, when an RLC entity associated with the PDCP is in the AM, the node hosting the PDCP counts the bytes of the PDCP SDU successfully delivered to the terminal through the secondary base station, thereby obtaining information about the volume of downlink data. In another example, when the RLC entity associated with the PDCP is in the UM, the node hosting the PDCP counts the bytes of the PDCP SDU transmitted to the terminal through the secondary base station, thereby obtaining information about the volume of downlink data. The node that hosts the PDCP counts the volume of uplink data in bytes of a PDCP SDU received using the radio resource of the secondary base station.

The information about the volume of data that the secondary base station transmits to and receives from the terminal using the radio resource of the secondary base station does not include the volume of data of a packet forwarded when a PDCP entity is reconfigured.

Further, when PDCP duplication is activated, transmitted duplicate packets are counted and included only once, thus accurately counting the volume of data.

The volume of data counted by the above method is included in a report message transmitted from the secondary base station to the master base station 900. Information elements included in the report message are illustrated in FIG. 5 and FIG. 6.

The secondary RAT data usage report message transmitted by the transmitter 920 may include information about the volume of data transmitted to and received from the terminal using the radio resource of the secondary base station for each EPS bearer. The information about the volume of data transmitted to and received from the terminal using the radio resource of the secondary base station may be separated by EPS bearer and may be included in the secondary RAT data usage report message.

The secondary RAT data usage report message may further include information about the volume of data transmitted to and received from the terminal using the radio resource of the secondary base station in association with a bearer terminating at the master base station 900. That is, the information about the volume of data received from the secondary base station may include only information about the volume of data associated with the secondary base station-terminated E-RAB, and the information about the volume of data associated with the bearer terminating at the master base station 900 may be counted by the master base station 900 and may be included in the secondary RAT data usage report message. Alternatively, the information about the volume of data associated with the bearer terminating at the master base station 900 may also be counted by the secondary base station and may be received by the receiver 930 via a separate report message.

As described above, the master base station 900 and the secondary base station use different radio access technologies. For example, the master base station may use the LTE radio access technology, and the secondary base station may use the NR radio access technology.

In addition, a controller 910 controls the overall operation of the master base station 900 to report NR radio resource volume information to the MME in an EN-DC network structure necessary to perform the foregoing embodiments.

The transmitter 920 and the receiver 930 are used to transmit and receive signals, messages, or data necessary to perform the foregoing present disclosure to and from the terminal, a core network, and the secondary base station.

Figure 10:
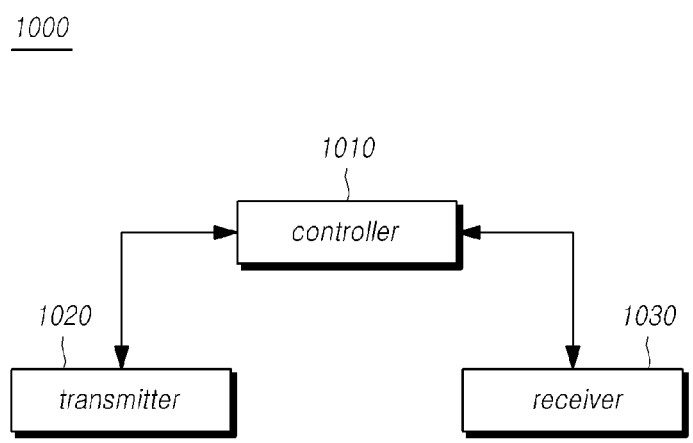
FIG. 10 is a block diagram illustrating a structure of a secondary base station according to one embodiment.

FIG. 10 is a block diagram illustrating a structure of a secondary base station according to one embodiment.

Referring to FIG. 10, the secondary base station 1000 that transmits data volume information of the secondary base station in a dual-connectivity situation may include: a controller 1010 that counts information about the volume of data that the secondary base station transmits to and receives from a terminal using a radio resource of the secondary base station; and a transmitter 1020 that transmits the information about the volume of data that the secondary base station transmits to and receives from the terminal using the radio resource of the secondary base station to a master base station using an X2 interface.

The information about the volume of data that the secondary base station 1000 transmits to and receives from the terminal using the radio resource of the secondary base station 1000 is included in a secondary RAT data usage report message transmitted by the master base station to an MME.

For example, the information about the volume of data that the secondary base station 1000 transmits to and receives from the terminal using the radio resource of the secondary base station 1000 includes information about the volume of data transmitted to and received from the terminal in association with an E-RAB terminating at the secondary base station 1000. In order to count the volume of data, the controller 1010 separately counts downlink data and uplink data.

For example, the controller 1010 may count the volume of downlink data in bytes of a PDCP SDU successfully delivered to the terminal through the secondary base station 1000 or bytes of a PDCP SDU transmitted to the terminal. Specifically, when an RLC entity associated with a PDCP is in the AM, the controller 1010 counts the bytes of a PDCP SDU successfully delivered to the terminal through the secondary base station 1000, thereby obtaining information about the volume of downlink data. However, when the RLC entity associated with the PDCP is in the UM, the controller 1010 counts the bytes of a PDCP SDU transmitted to the terminal through the secondary base station 1000, thereby obtaining information about the volume of downlink data.

In another example, the controller 1010 may count the volume of uplink data in bytes of a PDCP SDU received by a node that hosts the PDCP using the radio resource of the secondary base station 1000.

The transmitter 1020 transmits the information about the volume of data transmitted to and received from the terminal using the radio resource of the secondary base station 1000 to the master base station through an X2 interface periodically or according to triggering of a specific event.

The information about the volume of data transmitted to and received from the terminal using the radio resource of the secondary base station 1000 may be included in a report message. The report message may include a message type information element, an MeNB UE X2AP ID information element, an SgNB UE X2AP ID information element, and a secondary RAT usage report list information element. In particular, the secondary RAT usage report list information element may include E-RAB identification information, secondary base station type information, E-RAB usage report list information, usage count UL information, and usage count DL information. The volume of data transmitted to and received from the terminal using the radio resource of the secondary base station 1000 is stored in the usage count UL information and the usage count DL information.

The report message may include information about the volume of data transmitted to and received from the terminal using the radio resource of the secondary base station 1000 per E-RAB terminating at the secondary base station 1000. The volume of data transmitted to and received from the terminal using the radio resource of the secondary base station 1000 may not include the volume of data of a packet forwarded when the PDCP entity is reconfigured. In addition, when PDCP duplication is activated, transmitted duplicate packets are counted and included only once in the volume of data transmitted to and received from the terminal using the radio resource of the secondary base station 1000.

As described above, the information about the volume of data that the secondary base station 1000 transmits to and receives from the terminal using the radio resource of the secondary base station 1000 is included in a secondary RAT data usage report message transmitted by the master base station to the MME, and the master base station and the secondary base station 1000 use different radio access technologies. The secondary RAT data usage report message may further include information about the volume of data transmitted to and received from the terminal using the radio resource of the secondary base station in association with a master base station-terminated bearer. In addition, the secondary RAT data usage report message may include information about the volume of data transmitted to and received from the terminal using the radio resources of the secondary base station 1000 per EPS bearer.

In addition, the controller 1010 controls the overall operation of the secondary base station 1000 to report NR radio resource volume information to the master base station in an EN-DC network structure necessary to perform the foregoing embodiments.

The transmitter 1020 and a receiver 1030 are used to transmit and receive signals, messages, or data necessary to perform the foregoing present disclosure to and from the terminal, a core network, and the master base station

What is claimed is:

1. A method for transmitting, by a master base station, data volume information of a secondary base station in a dual-connectivity situation, the method comprising:
    receiving information about a volume of data transmitted to and received from a terminal using a radio resource of the secondary base station from the secondary base station; and
    transmitting a secondary radio access technology (RAT) data usage report message comprising the information about the volume of data transmitted to and received from the terminal using the radio resource of the secondary base station from the secondary base station to a mobility management entity (MME) using an S1-C interface,
    wherein the master base station and the secondary base station use different radio access technologies,
    wherein the information about the volume of data that the secondary base station transmits to and receives from the terminal using the radio resource of the secondary base station is information about a volume of data transmitted to and received from the terminal in association with an E-RAB terminating at the secondary base station where the E-RAB stands for an E-UTRAN Radio Access Bearer or an Evolved Universal Mobile Telecommunications System Terrestrial Radio Access Network Radio Access Bearer, and
    wherein the information about the volume of data that the secondary base station transmits to and receives from the terminal using the radio resource of the secondary base station excludes a volume of data of a packet forwarded when a PDCP entity is reconfigured, and comprises a duplicated packet which is counted only once when PDCP duplication is activated.

2. The method of claim 1, wherein the secondary RAT data usage report message comprises information about a volume of data transmitted to and received from the terminal using the radio resource of the secondary base station for each EPS bearer.

3. The method of claim 1, wherein the information about the volume of data that the secondary base station transmits to and receives from the terminal using the radio resource of the secondary base station is counted by a node that hosts a PDCP (Packet Date Convergence Protocol) and comprises both information about a downlink data volume and information about an uplink data volume,
    the downlink data volume is counted in bytes of a PDCP SDU (Packet Date Convergence Protocol Service Data Unit) successfully delivered to the terminal through the secondary base station or bytes of a PDCP SDU transmitted to the terminal, and
    the uplink data volume is counted in bytes of a PDCP SDU received by the node that hosts the PDCP using the radio resource of the secondary base station.

4. The method of claim 3, wherein the node that hosts the PDCP generates the information about the downlink data volume by counting the bytes of the PDCP SDU successfully delivered to the terminal through the secondary base station when an RLC entity associated with the PDCP is in an acknowledged mode (AM), and generates the information about the downlink data volume by counting the bytes of the PDCP SDU transmitted to the terminal through the secondary base station when the RLC entity associated with the PDCP is in an unacknowledged mode (UM).

5. The method of claim 1, wherein the information about the volume of data that the secondary base station transmits to and receives from the terminal using the radio resource of the secondary base station is comprised in a report message transmitted from the secondary base station to the master base station, and the report message comprises a message type information element, an MeNB UE X2AP ID information element, an SgNB UE X2AP ID information element, and a secondary RAT usage report list information element.

6. The method of claim 5, wherein the secondary RAT usage report list information element comprises E-RAB identification information, secondary base station type information, E-RAB usage report list information, usage count UL (Uplink) information, and usage count DL (Downlink) information.

7. The method of claim 1, wherein the secondary RAT data usage report message further comprises information about a volume of data transmitted to and received from the terminal using the radio resource of the secondary base station in association with a bearer terminating at the master base station.

8. A method for transmitting, by a secondary base station, data volume information of the secondary base station in a dual-connectivity situation, the method comprising:
    counting and generating information about a volume of data that the secondary base station transmits to and receives from a terminal using a radio resource of the secondary base station; and
    transmitting the information about the volume of data that the secondary base station transmits to and receives from the terminal using the radio resource of the secondary base station to a master base station using an X2 interface, wherein the information about the volume of data that the secondary base station transmits to and receives from the terminal using the radio resource of the secondary base station is comprised in a secondary RAT data usage report message transmitted by the master base station to a mobility management entity (MME), and
    the master base station and the secondary base station use different radio access technologies, wherein the information about the volume of data that the secondary base station transmits to and receives from the terminal using the radio resource of the secondary base station is information about a volume of data transmitted to and received from the terminal in association with an E-RAB terminating at the secondary base station where the E-RAB stands for an E-UTRAN Radio Access Bearer or an Evolved Universal Mobile Telecommunications System Terrestrial Radio Access Network Radio Access Bearer, wherein the information about the volume of data that the secondary base station transmits to and receives from the terminal using the radio resource of the secondary base station excludes a volume of data of a packet forwarded when a PDCP entity is reconfigured, and comprises a duplicated packet which is counted only once when PDCP duplication is activated.

9. The method of claim 8, wherein the counting includes:
counting a downlink data volume in bytes of a PDCP SDU (Packet Date Convergence Protocol Service Data Unit) successfully delivered to the terminal through the secondary base station or bytes of a PDCP SDU transmitted to the terminal; and
counting an uplink data volume is counted in bytes of a PDCP SDU received by a node that hosts a PDCP using the radio resource of the secondary base station.

10. The method of claim 9, wherein the counting includes:
generating information about the downlink data volume by counting the bytes of the PDCP SDU (Packet Date Convergence Protocol Service Data Unit) successfully delivered to the terminal through the secondary base station when an RLC entity associated with the PDCP is in an acknowledged mode (AM); and
generating information about the downlink data volume by counting the bytes of the PDCP SDU transmitted to the terminal through the secondary base station when the RLC entity associated with the PDCP is in an unacknowledged mode (UM).

11. A master base station for transmitting data volume information of a secondary base station in a dual-connectivity situation, the master base station comprising:
a receiver configured to receive information about a volume of data transmitted to and received from a terminal using a radio resource of the secondary base station from the secondary base station; and
a transmitter configured to transmit a secondary radio access technology (RAT) data usage report message comprising the information about the volume of data transmitted to and received from the terminal using the radio resource of the secondary base station from the secondary base station to a mobility management entity (MME) using an S1-C interface,
wherein the master base station and the secondary base station use different radio access technologies, and
wherein the information about the volume of data that the secondary base station transmits to and receives from the terminal using the radio resource of the secondary base station is information about a volume of data transmitted to and received from the terminal in association with an E-RAB terminating at the secondary base station where the E-RAB stands for an E-UTRAN Radio Access Bearer or an Evolved Universal Mobile Telecommunications System Terrestrial Radio Access Network Radio Access Bearer,
wherein the information about the volume of data that the secondary base station transmits to and receives from the terminal using the radio resource of the secondary base station excludes a volume of data of a packet forwarded when a PDCP entity is reconfigured, and includes a duplicated packet which is counted only once when PDCP duplication is activated.

12. The master base station of claim 11, wherein the secondary RAT data usage report message comprises information about a volume of data transmitted to and received from the terminal using the radio resource of the secondary base station for each EPS bearer.

13. The master base station of claim 11, wherein the information about the volume of data that the secondary base station transmits to and receives from the terminal using the radio resource of the secondary base station is counted by a node that hosts a PDCP (Packet Date Convergence Protocol) and comprises both information about a downlink data volume and information about an uplink data volume,
the downlink data volume is counted in bytes of a PDCP SDU (Packet Date Convergence Protocol Service Data Unit) successfully delivered to the terminal through the secondary base station or bytes of a PDCP SDU transmitted to the terminal, and
the uplink data volume is counted in bytes of a PDCP SDU received by the node that hosts the PDCP using the radio resource of the secondary base station.

14. The master base station of claim 13, wherein the node that hosts the PDCP generates the information about the downlink data volume by counting the bytes of the PDCP SDU successfully delivered to the terminal through the secondary base station when an RLC entity associated with the PDCP is in an acknowledged mode (AM), and generates the information about the downlink data volume by counting the bytes of the PDCP SDU transmitted to the terminal through the secondary base station when the RLC entity associated with the PDCP is in an unacknowledged mode (UM).

15. The master base station of claim 11, wherein the information about the volume of data that the secondary base station transmits to and receives from the terminal using the radio resource of the secondary base station is comprised in a report message transmitted from the secondary base station to the master base station, and
the report message comprises a message type information element, an MeNB UE X2AP ID information element, an SgNB UE X2AP ID information element, and a secondary RAT usage report list information element.

* * * * *